United States Patent [19]
Akiyama et al.

[11] 4,393,016
[45] Jul. 12, 1983

[54] PROCESS FOR PRODUCING PLATE-LIKE POLYSTYRENE RESIN FOAM

[75] Inventors: Hiroyuki Akiyama; Hideo Hatakeyama, both of Hiratsuka; Nobuyoshi Shimoyashiki, Isehara; Yoshiaki Momose, Hiratsuka; Fusao Imai, Kamakura, all of Japan

[73] Assignee: Japan Styrene Paper Corporation, Tokyo, Japan

[21] Appl. No.: 297,172

[22] Filed: Aug. 28, 1981

[30] Foreign Application Priority Data

Sep. 1, 1980 [JP] Japan ................................ 55/119856

[51] Int. Cl.³ .............................................. B29D 27/00
[52] U.S. Cl. .................................. 264/53; 264/177 R; 264/DIG. 13; 425/325; 425/817 C
[58] Field of Search ................ 264/DIG. 5, DIG. 13, 264/177 R, 53; 425/325, 817 C

[56] References Cited

U.S. PATENT DOCUMENTS

| 2,928,130 | 3/1960 | Gray | 264/DIG. 5 |
| 3,121,911 | 2/1964 | Lightner | 264/DIG. 5 |
| 3,160,688 | 12/1964 | Aykanian et al. | 264/DIG. 5 |
| 3,657,163 | 4/1972 | Kishikawa et al. | 264/DIG. 5 |
| 3,767,744 | 10/1973 | Holl | 264/DIG. 5 |
| 3,770,668 | 11/1973 | Corbett et al. | 264/53 |
| 4,020,025 | 4/1977 | Zeitler et al. | 264/DIG. 5 |
| 4,085,175 | 4/1978 | Keuchel | 264/DIG. 5 |
| 4,196,267 | 4/1980 | Watanabe et al. | 264/DIG. 5 |
| 4,260,572 | 4/1981 | Akiyama et al. | 264/53 |
| 4,308,352 | 12/1981 | Knaus | 264/53 X |

FOREIGN PATENT DOCUMENTS 52-24269 2/1977 Japan .
52-94366 8/1977 Japan .

Primary Examiner—Philip E. Anderson
Attorney, Agent, or Firm—Sherman & Shalloway

[57] ABSTRACT

In a process for producing a plate-like polystyrene resin foam which comprises extruding a molten mixture consisting of a polystyrene resin and a volatile blowing agent by an extruder into a zone having a lower pressure than the inside of the extruder; the improvement wherein said volatile blowing agent is a mixture consisting of dichlorodifluoromethane, ethyl chloride and methyl chloride in which dichlorodifluoromethane accounts for 50 to 70% by weight of the mixture and the remainder consists of ethyl chloride and methyl chloride and the amount of ethyl chloride is at least 30% by weight based on the total amount of ethyl chloride and methyl chloride; and wherein said volatile blowing agent is present in said molten mixture in a proportion of 8 to 17 parts by weight per 100 parts by weight of the polystyrene resin component.

4 Claims, No Drawings

PROCESS FOR PRODUCING PLATE-LIKE POLYSTYRENE RESIN FOAM

This invention relates to a process for producing a plate-like polystyrene resin foam. More specifically, it relates to a process for producing a plate-like polystyrene resin foam having excellent heat-insulating property, high mechanical strength and good dimensional stability.

Polystyrene resin foams are widely utilized as a heat-insulating material usually in the form of a plate-like extruded foam article because of their light weight, high thermal insulating effect, relatively low cost, ease of handling or processing, etc.

It is known to those skilled in the art that the thermal insulating properties of the plate-like polystyrene resin foams are effected by the type and amount of the blowing agent used. For example, the specifications of Japanese Laid-Open Patent Publications Nos. 24269/77 and 94366/77 disclose a method for producing a plate-like polystyrene resin foam having superior heat-insulating property by using a specified amount of a specified blowing agent. The heat-insulating properties of plate-like foam articles obtained by the methods of these Patent Publications can scarcely be said to be satisfactory, and their dimensional stability is insufficient.

Many other reports have been published as to the production of plate-like polystyrene resin foams by an extrusion molding method. Plate-like foams obtained thereby can hardly be said to have the properties required of a heat-insulating material and good moldability in an extrusion process, and prove to be unsatisfactory.

The present inventors have extensively worked on a method for producing a plate-like polystyrene resin foam having all of excellent heat-insulating property, mechanical strength and dimensional stability, suitable for use as a heat-insulating material by an extrusion molding method, and found that by using a specified amount of a mixed blowing agent consisting of specified proportions of dichlorodifluoromethane, ethyl chloride and methyl chloride, a polystyrene resin foam having a combination of the aforesaid properties can be easily produced with good extrusion moldability. This discovery has led to the present invention.

It is an object of this invention therefore to provide a plate-like polystyrene resin foam having excellent heat-insulating property, particularly a polystyrene resin foam having a thermal resistance R, determined for a specimen having a thickness of 25 mm at an average temperature of 23.9° C. (75° F.), of at least 5. The "thermal resistance R" denotes thickness (in.)/thermal conductivity (BTU·in./ft$^2$·hr·°F.). Larger R values mean better heat-insulating properties.

Another object of this invention is to provide in the extrusion molding of plate-like foams a process capable of producing easily a plate-like polystyrene resin foam having a large width.

Still another object of this invention is to provide a plate-like polystyrene resin foam having excellent mechanical strength and good dimensional stability.

The above objects and advantages of this invention are achieved in accordance with this invention by a process for producing a plate-like polystyrene resin foam which comprises extruding a molten mixture consisting of a polystyrene resin and a volatile blowing agent by an extruder into a zone having a lower pressure than the inside of the extruder, the improvement wherein said volatile blowing agent is a mixture consisting of dichlorodifluoromethane, ethyl chloride and methyl chloride in which dichlorodifluoromethane accounts for 50 to 70% by weight of the mixture and the remainder consists of ethyl chloride and methyl chloride and the amount of ethyl chloride is at least 30% by weight based on the total amount of ethyl chloride and methyl chloride; and wherein said volatile blowing agent is present in said molten mixture in a proportion of 8 to 17 parts by weight per 100 parts by weight of the polystyrene resin component.

The polystyrene resin in this invention denotes a homopolymer or copolymer containing styrene as a main constituent monomer with a styrene monomer content of at least 50 mole%, preferably at least 80 mole%, and encompasses a mixture of the aforesaid polymer or copolymer with another resin.

Examples of the homopolymer or copolymer suitable for the production of a plate-like polystyrene foam by the process of this invention include polystyrene, high impact polystyrene, a copolymer of styrene and maleic anhydride, a copolymer of styrene and acrylonitrile, and a copolymer of styrene/butadiene/acrylonitrile. Examples of the other resin that can be used in admixture with such a polymer include polyethylene, polypropylene, a copolymer of ethylene and vinyl acetate, polyvinyl chloride, and (meth)acrylic copolymers.

The polystyrene resin exemplified hereinabove in this invention preferably has a weight-average molecular weight (to be simply referred to as molecular weight), measured by gel permeation chromatography (GPC), of $20 \times 10^4$ to $35 \times 10^4$.

The use of such a polystyrene resin is important in increasing the mechanical strength of the resulting plate-like foam and improve its dimensional stability.

Generally, in the extrusion molding of a plate-like polystyrene resin foam, it has been the previous practice to mold a foam immediately after extrusion from a die orifice into a definite plate-like shape by passing it through a molding device called a guider. It has been usual therefore to regard polystyrene resins having a high molecular weight of, say, more than $20 \times 10^4$ as unsuitable in view of its extrusion moldability, and to use low-molecular-weight polystyrene resins having high flowability, for example, those having a molecular weight of less than $20 \times 10^4$.

On the other hand, when such a low-molecular-weight polystyrene resin is used, disadvantages arise in that although its extrudability is improved, a plate-like foam as a final product has low mechanical strength and poor dimensional stability.

It has been found in accordance with the present invention that if the composition of the volatile blowing agent used is chosen within the range specified in this invention, a polystyrene resin having a molecular weight of at least $20 \times 10^4$ can be used with good extrudability.

However, it is preferred that the molecular weight of the polystyrene resin used should not exceed $35 \times 10^4$.

In the present invention, the volatile blowing agent used is a mixture consisting of 50 to 70% by weight of dichlorodifluoromethane and the remainder being ethyl chloride and methyl chloride, wherein the amount of ethyl chloride is at least 30% by weight based on the total amount of ethyl chloride and methyl chloride.

Investigations of the present inventors have shown that by using a mixed blowing agent of a specified composition composed of dichlorodifluoromethane, ethyl chloride and methyl chloride in the process of this invention, dichlorodifluoromethane reduces the thermal conductivity of the resulting foam and therefore improves the heat-insulating property of the product, and ethyl chloride and methyl chloride serve to adjust the flowability of a foamable molten gel to a suitable extent and improve its extrusion moldability, and that ethyl chloride is conducive to increasing the amount of the mixed blowing agent and makes it possible to obtain a product having a high expansion ratio. It has also been found that as a result of increasing the amount of the mixed blowing agent used, a plate-like foam having excellent heat-insulating property can be easily produced.

When in the mixed blowing agent of the above-specified composition, the content of dichlorodifluoromethane is less than 50% by weight, the heat-insulating property of the resulting foam is poor, and it is impossible to obtain a foam having a thermal resistance R of at least 5. If the content of dichlorodifluoromethane exceeds 70% by weight, the extrusion moldability of the resin is poor. Consequently, corrugation occurs and a plate-like foam having a large width cannot be obtained. In order to obtain a plate-like foam having a thermal resistance of at least 5 with good extrusion moldability, it is essential that the content of dichlorodifluoromethane in the mixed blowing agent should be 50 to 70% by weight. When the content is within the range of 52.5 to 62.5% by weight, a plate-like foam having especially superior properties can be obtained.

In the mixed blowing agent, ethyl chloride should be included in an amount of at least 30% by weight based on the remainder, i.e., the total amount of ethyl chloride and methyl chloride. Preferably, the blowing agent contains 30 to 95% by weight of ethyl chloride and 5 to 70% by weight of methyl chloride based on the total amount of these chlorides.

Ethyl chloride has an effect of improving the flowability and extrusion moldability of the polystyrene resin and of making it possible to use a relatively large amount of the mixed blowing agent. If the amount of ethyl chloride is less than 30% by weight of the total amount of ethyl chloride and methyl chloride, use of a large amount of the mixed blowing agent in an attempt to obtain a plate-like foam of a high expansion ratio results in a surging phenomenon, and therefore, the extrusion moldability of the resin becomes poor and a plate-like foam having a good shape cannot be produced. Thus, this causes the inconvenience that the amount of the mixed blowing agent is restricted and only a plate-like foam having a low expansion ratio can be obtained.

The mixed blowing agent in this invention is used in an amount of 8 to 17 parts by weight per 100 parts by weight of the polystyrene resin. If it is less than 8 parts by weight, the density of the resulting plate-like foam increases. If it exceeds 17 parts by weight, a surging phenomenon occurs at the time of extrusion, and it is difficult to obtain a plate-like foam having a good shape. Even when it can be obtained, its density is unduly low, and its mechanical strength is poor. Furthermore, large cells occur, and the foam become non-uniform and is deteriorated in heat-insulating property. The desired object of this invention can therefore be not achieved.

The functions of dichlorodifluoromethane, ethyl chloride and methyl chloride in the mixed blowing agent used in this invention combine organically and exhibit the aforesaid excellent effect when their proportions are within the aforesaid specified range. Accordingly, if any one of them is lacking, the excellent effect of the present invention cannot be expected.

For example, if dichlorodifluoromethane alone is used as the blowing agent, surging tends to occur at the time of extrusion, and accordingly, the amount of the blowing agent is restricted so that a product expanded to a high degree cannot be obtained. On the other hand, the use of methyl chloride alone as the blowing agent causes the inconvenience that the heat-insulating property of the resulting plate-like foam is very poor. When ethyl chloride is not used, namely when a mixture of dichlorodifluoromethane and methyl chloride is used, it is difficult to expand a plate-like foam to a high ratio and impart excellent heat-insulating property in whatever manner the ratio between these constituents of the blowing agent is changed. If the proportion of methyl chloride is increased, it is difficult to obtain a product having excellent heat-insulating property. On the other hand, when in order to improve its heat-insulating property the proportion of dichlorodifluoromethane is increased, a surging phenomenon tends to occur at the time of extrusion, and the total amount of the mixed blowing agent is restricted. This consequently causes the inconvenience that a plate-like foam having a high expansion ratio cannot be obtained.

Methyl chloride has the advantage that when it is included in a suitable amount, i.e. up to 70% by weight based on the total amount of ethyl chloride and methyl chloride, a plate-like foam having a higher expansion ratio can be obtained than in the case of not including methyl chloride when the amount of the mixed blowing agent is the same for both.

As stated hereinabove, only the mixed blowing agent of the specified composition in accordance with this invention exhibits an excellent effect in the production of a plate-like foam having good properties for use as a heat-insulating material. In particular, the present invention is especially advantageous in the production of a plate-like foam having good dimensional stability, a thermal resistance R of at least 5, a large width of, say, at least 1200 mm and a mechanical strength, for example a compressive strength, in the thickness direction, of at least 2.5 kg/cm$^2$.

In an amount which does not impair the desired objects of this invention, another blowing agent such as propane, butane or pentane may be added as another component to the mixed blowing agent of the above-specified composition.

The components of the mixed blowing agent are fed either separately or as a pre-mixed mass into an extruder through a site for feeding the blowing agent.

Preferably, the polystyrene resin is fed in the form of pellets into the extruder and heat-melted. The resulting molten mass gradually advances forward, and is mixed with the blowing agent in a mixing zone before reaching a cooling zone. The temperature at which the foamable molten gel containing the blowing agent is extruded through a die orifice is within a range of temperatures at which the foamable molten gel has a melt viscosity suitable for foaming.

Accordingly, the temperature is generally 90° C. to 120° C. although it differs depending upon the type of the polystyrene resin or the composition and amount of the blowing agent. The pressure of the die orifice is generally 50 to 140 kg/cm$^2$.

The foamable molten gel extruded into a lower pressure zone through the die orifice expands, and by being passed through a molding device generally called a guider, is continuously molded into a plate-like foam article having a predetermined cross-sectional area.

In the present invention, scraps and the like which are generated at the time of machining the extrusion-molded plate-like foam into products may be again pulverized, and can be mixed with a fresh starting material. When the scraps are desired to be used again, the amount of the scraps to be mixed with fresh polystyrene resin is preferably up to about 30% by weight based on the starting polystyrene resin.

In the present invention, a cell controlling agent may be added in order to render the cells of the plate-like foam finer. Examples of such a cell controlling agent are fine powders of inorganic compounds such as talc and clay, and compounds capable of decomposing or chemically changing at the heating temperature to evolve gases, such as a combination of a polycarboxylic acid or its acid alkali metal salt and a carbonate or bicarbonate. Such a cell controlling agent is usually used in an amount of 0.05 to 3 parts by weight, per 100 parts by weight of the polystyrene resin. Furthermore, additives such as coloring agents, heat stabilizers and fillers may be added as desired in amounts which do not impair the desired objects of this invention.

The following Examples illustrate the present invention more specifically.

EXAMPLE 1

One hundred parts by weight of polystyrene having a molecular weight of $22 \times 10^4$ and 0.1 part by weight of a cell controlling agent consisting of an equimolar mixture of monosodium citrate and sodium bicarbonate were fed into an extruder having an inside cylinder diameter of 120 mm.

From a feed port for a blowing agent provided in the extruder, 12 parts by weight, per 100 parts by weight of the polystyrene, of a mixed blowing agent was forced into the extruder. The mixed blowing agent consisted of 53% by weight of dichlorodifluoromethane and the remainder being 32% by weight of ethyl chloride and 68% by weight of methyl chloride based on the weight of the remainder.

The foamable melt gel uniformly kneaded within the extruder was extruded at 110° C. through a die orifice having a width of 600 mm and a clearance of 6 mm and provided at the exit of the extruder, and foamed. Further, it was passed through a guider annexed thereto into a plate-like foam having a width of about 1200 mm and a thickness of about 28 mm.

The plate-like foam was cut into pieces having a width of 1200 mm, a thickness of 25 mm and a length of 1800 mm in cross section, and machined to form test specimens.

The extrusion moldability of the polystyrene resin observed in the manufacturing process is shown in Table 1 together with the composition of the mixed blowing agent used.

The properties including thermal resistance of the resulting test specimens were measured, and the results are shown in Table 1.

Table 1 also gives the results of the following Examples and Comparative Examples.

EXAMPLES 2 to 5 AND COMPARATIVE EXAMPLES 1 to 5

The procedure of Example 1 was repeated except that each of the mixed blowing agents having the compositions shown in Table 1 was used.

TABLE 1

| | Mixed blowing agent | | | | | | | | |
|---|---|---|---|---|---|---|---|---|---|
| | Content of dichloro-difluoro-methane (wt. %) | Proportions of the other components (wt. %) | | Total amount (wt. parts) | Extrusion moldability | Density of the foam (g/cm$^3$) | Average cell diameter (mm) | Thermal resistance R (in/BTU · in/ ft$^2$ · hr · °F.) | Compressive strength (Kg/cm$^2$) | Dimensional stability |
| | | Ethyl chloride | Methyl chloride | | | | | | | |
| Example 1 | 53 | 32 | 68 | 12 | Good | 0.030 | 0.3 | 5.1 | 2.8 | ◎ |
| Example 2 | 56 | 45 | 55 | 16 | " | 0.028 | 0.3 | 5.5 | 2.7 | ◎ |
| Example 3 | 60 | 50 | 50 | 15 | " | 0.028 | 0.3 | 5.5 | 2.7 | ◎ |
| Example 4 | 62 | 80 | 20 | 13 | " | 0.031 | 0.2 | 5.3 | 2.8 | ◎ |
| Example 5 | 65 | 95 | 5 | 15 | " | 0.030 | 0.3 | 5.5 | 2.8 | ◎ |
| Comparative Example 1 | 48 | 50 | 50 | 10 | " | 0.030 | 0.4 | 4.7 | 2.8 | ○ |
| Comparative Example 2 | 65 | 55 | 45 | 7 | Fair | 0.038 | 0.2 | 4.8 | 3.0 | ○ |
| Comparative Example 3 | 65 | 20 | 80 | 8 | " | 0.037 | 0.3 | 4.7 | 3.0 | X |
| Comparative Example 4 | 75 | 50 | 50 | 8 | " | 0.038 | 0.3 | 4.7 | 3.1 | X |
| Comparative Example 5 | 60 | 50 | 50 | 18 | Poor; surging occured, and a plate-like foam cannot be obtained. | | | | | |

Note to Table 1

(1) Thermal resistance: Measured three months after production.

(2) Compressive strength: Strength in the thickness direction.

(3) Dimensional stability

After production, the product was allowed to stand at 20° C. for 72 hours, and further heated in an oven at 70° C. for 22 hours. The percentage of the dimension of the product after this treatment based on the original dimension was determined, and evaluated as follows:

◎ : less than ±0.5%
○ : less than ±1.0%
X: at least ±1.0%

What we claim is:

1. In a process for producing a plate-like polystyrene resin foam which comprises extruding a molten mixture consisting of a polystyrene resin and a volatile blowing agent by an extruder into a zone having a lower pressure than the inside of the extruder; the improvement wherein said volatile blowing agent is a mixture consisting of dichlorodifluoromethane, ethyl chloride and methyl chloride in which dichlorodifluoromethane accounts for 50 to 70% by weight of the mixture and the remainder consists of ethyl chloride and methyl chloride and the amount of ethyl chloride is at least 30% by weight based on the total amount of ethyl chloride and methyl chloride; and wherein said volatile blowing agent is present in said molten mixture in a proportion of 8 to 17 parts by weight per 100 parts by weight of the polystyrene resin component.

2. The process set forth in claim 1 wherein the amount of dichlorodifluoromethane in the mixed blowing agent is 52.5 to 62.5% by weight.

3. The process set forth in claim 1 wherein the remainder of the mixed blowing agent consists of 30 to 95% by weight of ethyl chloride and 5 to 70% by weight of methyl chloride.

4. The process set forth in claim 1 wherein the polystyrene resin has a weight-average molecular weight, measured by gel permeation chromatography (GPC), of $20 \times 10^4$ to $35 \times 10^4$.

* * * * *